US011110776B2

(12) United States Patent
Urano et al.

(10) Patent No.: US 11,110,776 B2
(45) Date of Patent: Sep. 7, 2021

(54) REMOTELY CONTROLLING COMFORT COMPONENTS IN AN AUTONOMOUS VEHICLE

(71) Applicant: TOYOTA RESEARCH INSTITUTE, INC., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 332 days.

(21) Appl. No.: 16/222,645

(22) Filed: Dec. 17, 2018

(65) Prior Publication Data

US 2020/0189350 A1 Jun. 18, 2020

(51) Int. Cl.
*B60H 1/00* (2006.01)
*G05D 1/00* (2006.01)
*G06Q 10/02* (2012.01)
*G01C 21/34* (2006.01)

(52) U.S. Cl.
CPC ....... *B60H 1/00657* (2013.01); *G05D 1/0088* (2013.01); *G06Q 10/02* (2013.01); *G01C 21/3469* (2013.01); *G05D 2201/0213* (2013.01)

(58) Field of Classification Search
CPC ............ B60H 1/00657; B60H 1/00771; B60H 1/00357; G05D 1/0088; G05D 2201/0213; G06Q 10/02; G01C 21/3469
USPC .......................................................... 701/23
See application file for complete search history.

(56) References Cited

U.S. PATENT DOCUMENTS

| 9,002,568 | B2 | 4/2015 | Datta et al. |
| 10,035,403 | B2 | 7/2018 | Petrenga |
| 2014/0172727 | A1* | 6/2014 | Abhyanker ........ G06Q 30/0645 705/307 |
| 2014/0247348 | A1 | 9/2014 | Moore et al. |
| 2017/0349027 | A1* | 12/2017 | Goldman-Shenhar ...................... B60H 1/0075 |
| 2018/0070290 | A1* | 3/2018 | Breaux ................... H04W 4/40 |
| 2018/0208017 | A1 | 7/2018 | Hernandez et al. |

* cited by examiner

*Primary Examiner* — Muhammad Shafi
(74) *Attorney, Agent, or Firm* — Seyfarth Shaw LLP

(57) ABSTRACT

A method for selecting an autonomous mobility-as-a-service (MAAS) vehicle is presented. The method includes transmitting, to a customer, location information of an autonomous MAAS vehicle within the customer's vicinity. The method also includes transmitting, to the customer, a compartment climate value corresponding to the autonomous MAAS vehicle. The method further includes selecting the autonomous MAAS vehicle based on the compartment climate value, such that the selected autonomous MAAS vehicle navigates to a location of the customer.

18 Claims, 7 Drawing Sheets

REMOTELY CONTROLLING COMFORT COMPONENTS IN AN AUTONOMOUS VEHICLE

BACKGROUND

Field

Certain aspects of the present disclosure generally relate to controlling comfort components and, more particularly, to a system and method for remotely controlling comfort components of an autonomous vehicle.

Background

Vehicles include various comfort components, such as a heater, an air conditioner (AC), and a defroster to improve a passenger's comfort. An interface for the comfort components may vary amongst vehicles. Therefore, when entering a new vehicle, a passenger may be unfamiliar with the interface. Additionally, in ride share vehicles, such as a taxi, the passenger typically sits in one of the rear seats, thereby limiting their access to the interface. The ride share vehicle may also be referred to as a mobility-as-a-service (MAAS) vehicle.

In conventional non-autonomous MAAS vehicles, the driver adjusts one or more comfort components based on a passenger's request. In contrast, for conventional autonomous MAAS vehicles, based on the passenger's unfamiliarity with the interface and/or the physical distance to the interface, it is difficult for the passenger to adjust one or more comfort components. As such, there is a need to improve comfort components of vehicles, such as autonomous MAAS vehicles, such that one or more comfort components may be remotely adjusted to a passenger's desired setting.

SUMMARY

In one aspect of the present disclosure, a method selecting an autonomous mobility-as-a-service (MAAS) vehicle is disclosed. The method includes transmitting, to a customer, location information of an autonomous MAAS vehicle within the customer's vicinity. The method also includes transmitting, to the customer, a compartment climate value corresponding to the autonomous MAAS vehicle. The method further includes selecting the autonomous MAAS vehicle based on the compartment climate value, such that the selected autonomous MAAS vehicle navigates to a location of the customer.

In another aspect of the present disclosure, a non-transitory computer-readable medium with non-transitory program code recorded thereon is disclosed. The program code is for selecting an autonomous MAAS vehicle. The program code is executed by a processor and includes program code to transmit, to a customer, location information of an autonomous MAAS vehicle within the customer's vicinity. The program code also includes program code to transmit, to the customer, a compartment climate value corresponding to the autonomous MAAS vehicle. The program code further includes program code to select the autonomous MAAS vehicle based on the compartment climate value, such that the selected autonomous MAAS vehicle navigates to a location of the customer.

Another aspect of the present disclosure is directed to an apparatus for selecting an autonomous MAAS vehicle. The apparatus having a memory and one or more processors coupled to the memory. The processor(s) is configured to transmit, to a customer, location information of an autonomous MAAS vehicle within the customer's vicinity. The processor(s) is also configured to transmit, to the customer, a compartment climate value corresponding to the autonomous MAAS vehicle. The processor(s) is further configured to select the autonomous MAAS vehicle based on the compartment climate value, such that the selected autonomous MAAS vehicle navigates to a location of the customer.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
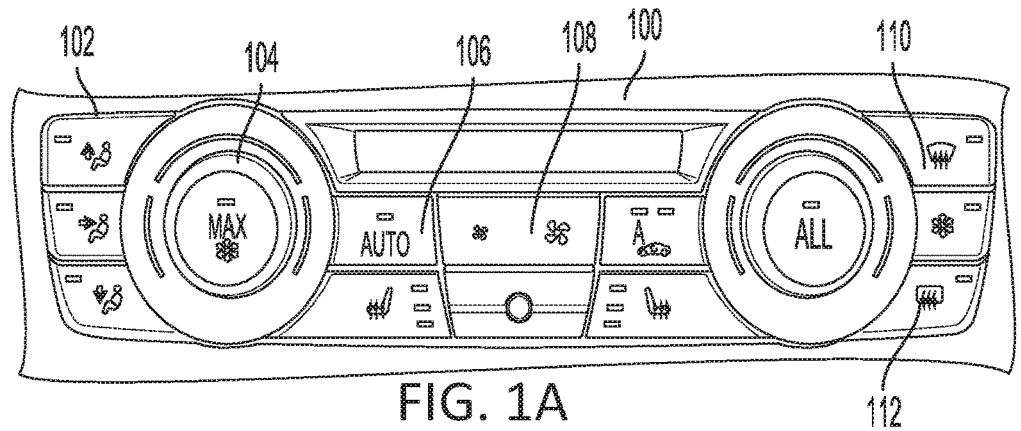
FIGS. 1A, 1B, and 1C illustrate examples of different comfort component interfaces according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Vehicles include various comfort components, such as a heater, an air conditioner (AC), and a defroster to improve a passenger's comfort. The comfort components may also be referred to as climate components. The interface for the comfort components may vary amongst vehicle brands, as well as amongst vehicles within a same brand. Due to the diversity in interfaces, a passenger may be unfamiliar with an interface when entering a new vehicle. Additionally, in ride share vehicles, such as a taxi, the passenger typically sits in one of the rear seats, thereby limiting their access to the interface.

Figure 1B:
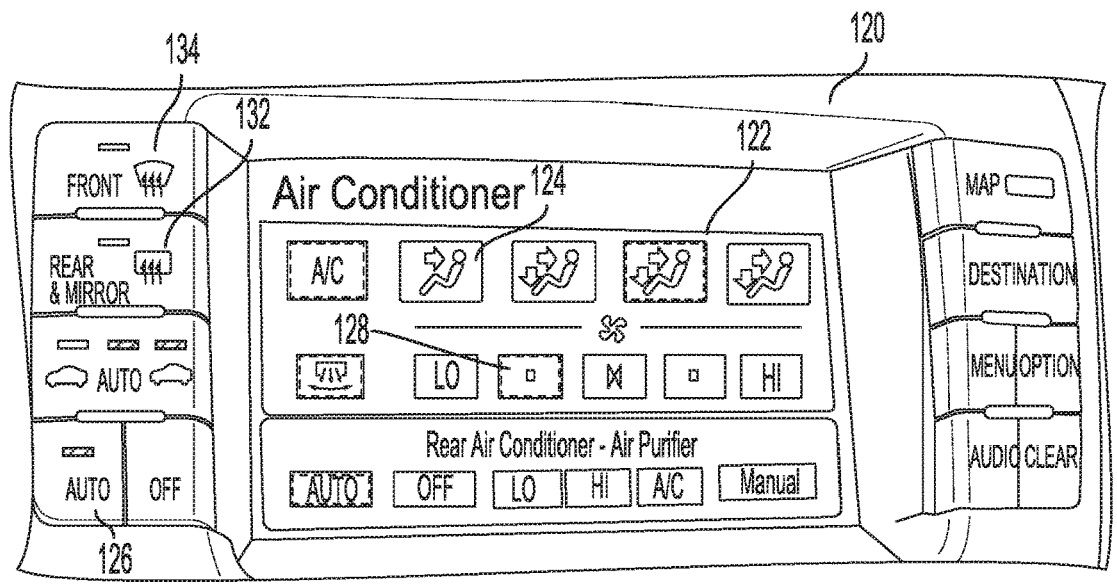
Figure 1C:
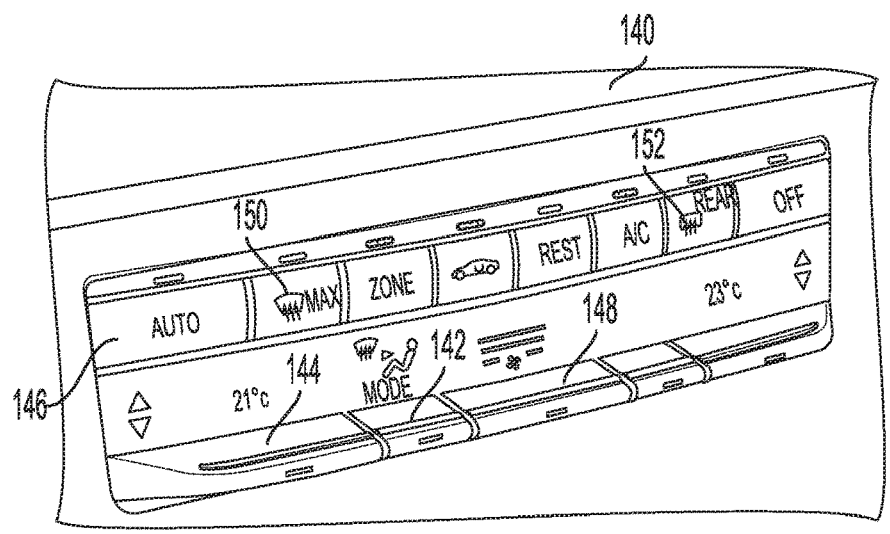

FIGS. 1A, 1B, and 1C illustrate examples of different interfaces 100, 120, 140 for comfort components of a first vehicle, second vehicle, and third vehicle. As shown in FIGS. 1A, 1B, and 1C, the layout of the interfaces 100, 120, 140 is different in each vehicle. For example, as shown in FIG. 1A, the interface 100 includes an air direction controller 102, a temperature controller 104, an auto climate controller 106, a fan speed controller 108, a front defrost controller 110, and a rear defrost controller 112.

In another example, as shown in FIG. 1B, the interface 120 includes a touchscreen 122. The interface 120 of the second vehicle includes an air direction controller 124, an auto climate controller 126, a fan speed controller 128, a front defrost controller 134, and a rear defrost controller 132. The interface 120 of the second vehicle does not include a temperature controller. Although the temperature controller may be accessible via one of the screens displayed on the touchscreen 122, it may be difficult for a passenger to find the temperature controller if it is their first time in the second vehicle.

In another example, as shown in FIG. 1C, the interface 140 of the third vehicle includes an air direction controller 142, a temperature controller 144, an auto climate controller 146, a fan speed controller 148, a front defrost controller 150, and a rear defrost controller 152. As shown in FIG. 1C, the interface 140 of the third vehicle is different from the interfaces 100, 120 of the first and second vehicles. Additionally, as shown in FIG. 1B, the interface 120 of the second vehicle is different from the interfaces 100, 140 of the first and third vehicles.

Because each vehicle may have a different interface 100, 120, 140, it may be difficult for a passenger to adjust one or more comfort components in a vehicle. Aspects of the present disclosure are directed to remotely adjusting one or more comfort components based on a passenger's preferences. In one configuration, the comfort components are for an autonomous vehicle. The autonomous vehicle may be a mobility-as-a-service (MAAS) vehicle. An MAAS vehicle is a vehicle that may be ordered on-demand or reserved for a specific time in the future. In the present application, the MAAS vehicle may be referred to as a vehicle.

Figure 2:
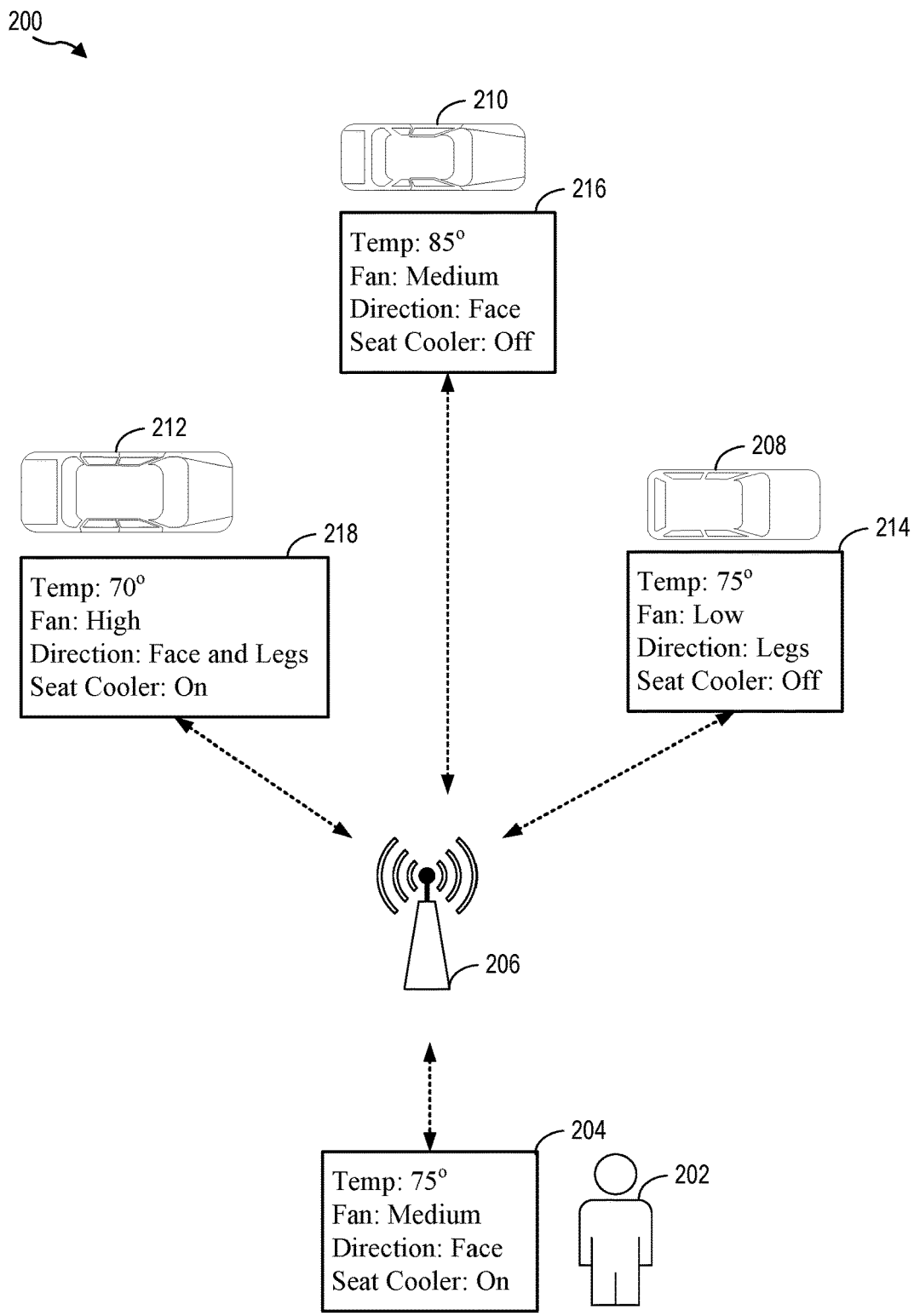
FIG. 2 illustrates an example of a system for selecting a mobility-as-a-service (MAAS) vehicle based on compartment data according to aspects of the present disclosure.

FIG. 2 illustrates an example of a MAAS system 200 according to aspects of the present disclosure. As shown in FIG. 2, a user 202 is associated with compartment preferences 204. The compartment preferences 204 are the user's 202 preferences for one or more comfort components of a vehicle. For example, the compartment preferences 204 may include a temperature preference, a fan speed preference, an air direction preference, and a seat cooler preference. Aspects of the present disclosure are not limited to the compartment preferences 204 shown in FIG. 2. Other preferences may be stored. In the current example, the user 202 has a temperature preference of seventy-five degrees, a fan speed preference of medium, an air direction preference of face (e.g., the air blows up towards the user's 202 face), and a seat cooler preference of on (e.g., the user 202 would like the seat cooler to be on).

The compartment preferences 204 may be set by the user 202 and may be stored in a user profile. The user profile may be stored on a user's device and/or stored at an MAAS control center 206. In one configuration, the user 202 requests a vehicle to arrive at a designated location. Alternatively, the vehicle may be one of multiple vehicles parked at a pick-up location, such as an airport pick-up lot.

The vehicle may be requested via an application on the user's device, such as a mobile device or a personal computer (PC). The vehicle request may be transmitted to the MAAS control center 206, where an operator selects a vehicle for the user 202. The operator of the MAAS control center 206 may be a human and/or an autonomous device. In response to receiving the vehicle request, the operator at the MAAS control center 206 identifies vehicles 208, 210, 212 within a radius of the user 202. Each vehicle 208, 210, 212 is associated with current compartment data 214, 216, 218.

The current compartment data 214, 216, 218 may be periodically transmitted to the MAAS control center 206 from each vehicle 208, 210, 212. The current compartment data 214, 216, 218 may also be transmitted in response to a request from the MAAS control center 206. The request for the current compartment data 214, 216, 218 may be transmitted from the MAAS control center 206 when the MAAS control center 206 receives a vehicle request from the user 202. The current compartment data 214, 216, 218 may also be transmitted to the MAAS control center 206 when one of the comfort component values is greater than or less than a threshold.

The operator at the MAAS control center 206 compares the user's 202 compartment preferences 204 with the current compartment data 214, 216, 218 to dispatch one of the vehicles 208, 210, 212 to the user 202. In one configuration, the vehicle 208, 210, 212 with the current compartment data 214, 216, 218 that is most similar to the user's 202 compartment preferences 204 is dispatched to the user 202. For example, the second vehicle 210 matches the user's 202 compartment preferences 204 for the fan speed (medium) and air direction (face). The number of matches between the current compartment data 216 of the second vehicle 210 and the user's 202 compartment preferences 204 is greater than the number of matches for the current compartment data 214, 218 of the other vehicles 208, 212.

In another configuration, one or more comfort component values are weighed more than other values. For example, a temperature value may be weighed more than a fan speed value. In this example, the operator selects the vehicle 208, 210, 212 with a temperature that has the least difference from the temperature in the user's 202 compartment preferences 204. For example, the first vehicle's 208 temperature (seventy-five degrees) matches the temperature (seventy-five degrees) in the user's 202 compartment preferences 204. Therefore, the operator of the MAAS control center 206 would dispatch the first vehicle 208 to the user 202.

In yet another configuration, the operator estimates an amount of energy that would be used to navigate each vehicle 208, 210, 212 to the user 202. Additionally, the operator determines an amount of energy that would be used to adjust the vehicle's 208, 210, 212 current compartment data 214, 216, 218 to match the user's 202 compartment preferences 204. The amount of energy used to adjust the vehicle's 208, 210, 212 current compartment data 214, 216, 218 may be based on current weather conditions, vehicle type, distance to the user 202, and other factors. In this configuration, the operator selects the vehicle 208, 210, 212 that would use the least amount of energy (e.g., battery power or gas) to arrive at the designated location with a compartment that matches the user's 202 compartment preferences 204.

For example, an amount of energy to change a current temperature from eighty-five degrees to seventy-five degrees is greater than an amount of energy needed to change the fan speed. As another example, an amount of energy to change a current temperature from eighty-five degrees to seventy-five degrees when the current weather is hot is greater than an amount of energy to change a current temperature from eighty-five degrees to seventy-five degrees when the current weather is cool and raining. In one configuration, the current compartment data 214, 216, 218 includes the vehicle's 208, 210, 212 battery or gas status, such that the MAAS control center 206 may factor battery or gas use in dispatching one of the vehicles 208, 210, 212.

Upon dispatching one of the vehicles 208, 210, 212, the MAAS control center 206 adjusts one or more of the comfort compartments of the dispatched vehicle to match the user's 202 compartment preferences 204. In another configuration, the comfort compartments of the dispatched vehicle are not adjusted until the user 202 enters the dispatched vehicle. In some cases, two or more vehicles 208, 210, 212 may have a same number of comfort compartments that match the user's 202 compartment preferences 204. In this scenario, the operator may select the vehicle 208, 210, 212 that is nearest to the user 202.

Figure 3A:
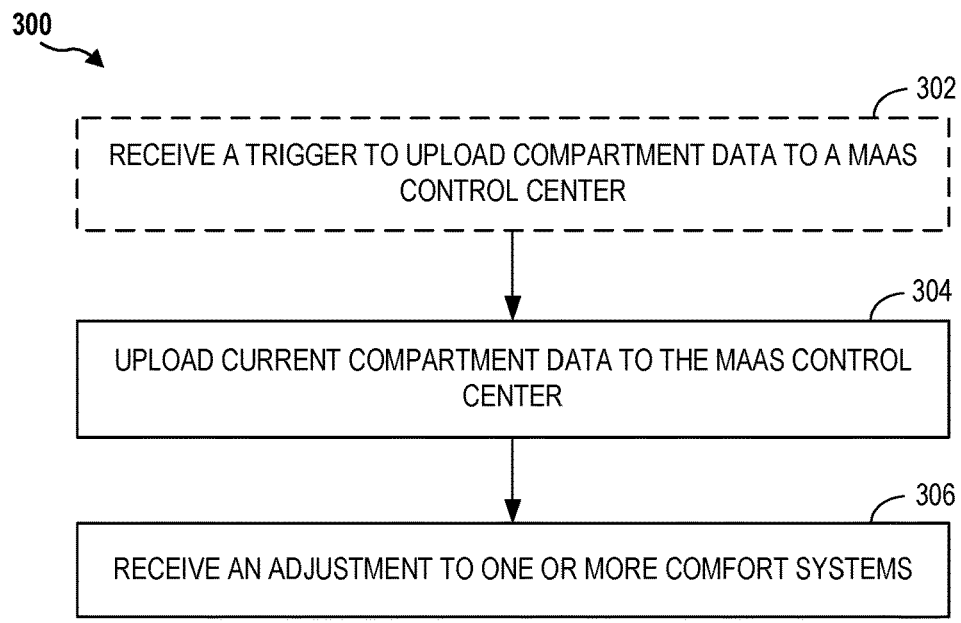
FIGS. 3A and 3B illustrate flow diagrams for transmitting compartment data to an MAAS control center according to aspects of the present disclosure.

As discussed above, in one configuration, a vehicle uploads current compartment data (e.g., current temperature, fan speed, air direction, etc.) to an MAAS control center. FIG. 3A illustrates a flow diagram 300 for updating one or more comfort components in the vehicle according to aspects of the present disclosure. As shown in FIG. 3A, in an optional configuration, at block 302, the vehicle receives a trigger to upload compartment data to a MAAS control center. The trigger may be transmitted from the MAAS control center in response to a user requesting a vehicle. The vehicle may also upload current compartment data based on a schedule, such as once every thirty minutes.

At block 304, the vehicle uploads current compartment data to the MAAS control center. The compartment data may include, but is not limited to, compartment temperature, external temperature, compartment humidity, external humidity, a number of passengers in the vehicle, battery level, gas level, fan speed, air direction, seat heating/cooling status, and/or other relevant data. The compartment refers to the passenger space within the vehicle (e.g., the vehicle's cabin).

At block 306, the vehicle receives an adjustment to one or more comfort components. The adjustment may be determined by an operator at the MAAS control center based on the uploaded current compartment data. That is, based on the current compartment data, the operator may remotely adjust one or more comfort components in the vehicle. The comfort components include, but are not limited to, a heating system, an air conditioner, a fan, an air vent direction, a defroster, and/or a seat heater/cooler.

The adjustment may be based on default comfort component settings, a user's compartment preferences, or other factors. For example, if a user requests a vehicle, the operator may adjust one or more comfort components to match the user's compartment preferences. In this example, if the user prefers the temperature at seventy-five degrees, the operator adjusts the heater or air conditioner, such that the compartment is at seventy-five degrees when the vehicle arrives at the user.

Aspects of the present disclosure are not limited to adjusting comfort components. Other compartment components may also be adjusted. The other compartment components may include, but are not limited to, radio station, radio volume, interior lighting, window shades, in-seat entertainment, and/or seat position. For example, a user's compartment preferences may include a preferred music type, such as 90's hip-hop. In this example, in addition to adjusting one or more comfort components, the operator may adjust the radio to play the customer's preferred music type.

Figure 3B:
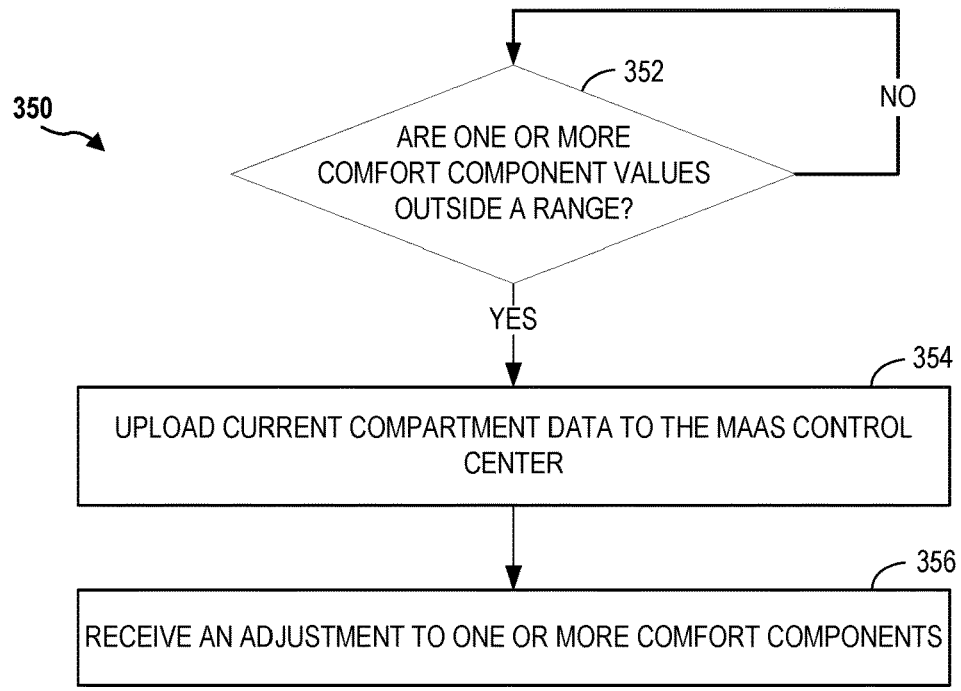

In one configuration, the current compartment data is uploaded to the MAAS control center if one or more comfort component values is outside a range. FIG. 3B illustrates a flow diagram 350 for updating one or more comfort components in the vehicle according to aspects of the present disclosure. As shown in FIG. 3B, at block 352, the vehicle determines if one or more comfort component values is outside a range. The comfort components may have different ranges (e.g., upper threshold and lower threshold). For example, a temperature range may be eighty degrees to sixty-five degrees. In this example, the temperature is outside the range if the temperature is greater than eighty degrees or less than sixty-five degrees. Some comfort components, such as air direction, may not be associated with a range.

If the comfort component values are within the corresponding ranges, the vehicle continues to monitor the comfort component values. Alternatively, if one or more comfort component values is outside a corresponding range, at block 354, the vehicle uploads current compartment data to the MAAS control center. At block 356, the vehicle receives an adjustment to one or more comfort components. The adjustment may be determined by an operator at the MAAS control center in response to the uploaded current compartment data. As an example, the adjustment may adjust a temperature of the air conditioner. As another example, the adjustment may activate or deactivate one or more comfort components.

The adjustment may be based on a corresponding range of a comfort component, a user's compartment preferences, or other factors. For example, if the temperature is greater than an upper threshold or less than a lower threshold, the heater or air conditioner is adjusted to set the temperature within the upper and lower thresholds. The adjustment is not limited to a specific comfort component. For example, if the temperature is greater than an upper threshold, the windows may be lowered and/or the fan speed may be adjusted rather than adjusting the heater or air conditioner.

As another example, a passenger may deactivate all comfort components. As a result, the compartment temperature may increase or decrease based on the external temperature. In one configuration, after the passenger exits the vehicle, the current compartment data is uploaded the MAAS control center. An operator of the MAAS control center may activate one or more comfort components based on the uploaded compartment data. The operate may activate/deactivate comfort components when the vehicle is occupied or when the vehicle is unoccupied.

Figure 4A:
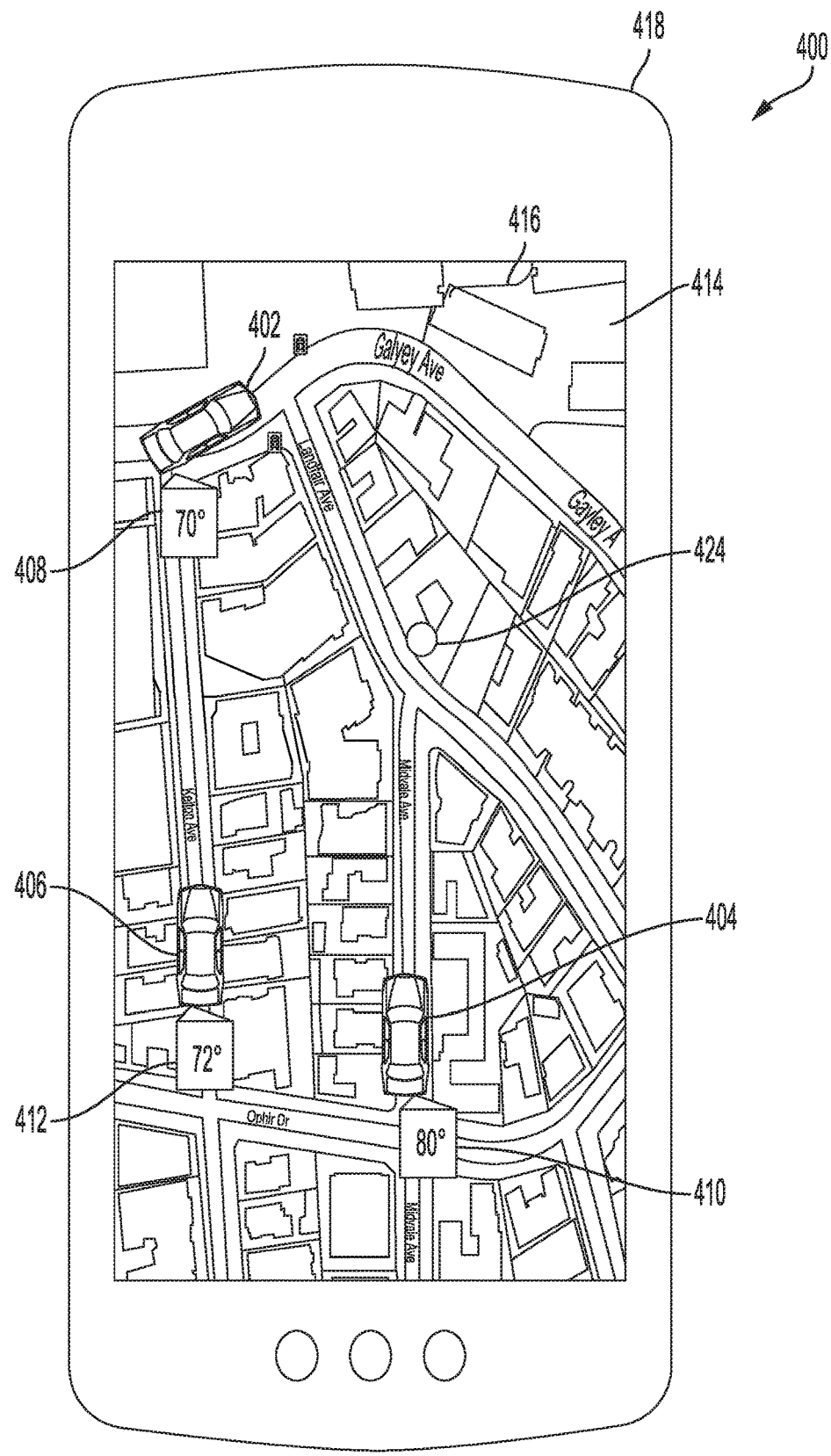
FIGS. 4A and 4B illustrate examples of selecting an MAAS vehicle based on compartment data according to aspects of the present disclosure.

According to an aspect of the present disclosure, a user may view current compartment data of surrounding vehicles prior to summoning a vehicle. FIG. 4A illustrates an example 400 of displaying one or more comfort component values 408, 410, 412 based on a vehicle's 402, 404, 406 current compartment data according to aspects of the present disclosure. As shown in FIG. 4A, an MAAS application may display vehicles 402, 404, 406 near the user's location 424. The vehicles 402, 404, 406 may be displayed via a display unit 416 of a user device 418. The user device 418 is not limited to a mobile phone as shown in FIG. 4A, other types of devices may also be used to execute the MAAS application.

In one configuration, the MAAS application transmits the user's location 424 to an MAAS control center. The user's location 424 may be based on position coordinates, such as GPS coordinates, obtained via the user device 418. In response, the MAAS control center provides a list of vehicles 402, 404, 406 and their current locations in relation to the user's location 424. Based on the information provided by the MAAS control center, the MAAS application may display the vehicles 402, 404, 406 on a map 414 in relation to the user's location 424.

In addition to providing the list of vehicles 402, 404, 406 and their current locations, the MAAS control center also transmits current compartment data of each vehicle 402, 404, 406 to the MAAS application. As previously discussed, each vehicle 402, 404, 406 may transmit current compartment data to the MAAS control center based on a trigger, a schedule, and/or one or more comfort values being out of range. The MAAS application may display one or more comfort component values 408, 410, 412 based on a vehicle's 402, 404, 406 current compartment data.

For example, as shown in FIG. 4A, the MAAS application displays the current temperature for each vehicle 402, 404, 406. The comfort component value 408, 410, 412 that is displayed may be configured by the user. As an example, the user may prefer to only view the temperature of each vehicle 402, 404, 406. As another example, user may prefer to view the temperature and humidity of each vehicle 402, 404, 406. The displayed comfort component value 408, 410, 412 may be one or more values of the compartment data.

Figure 4B:
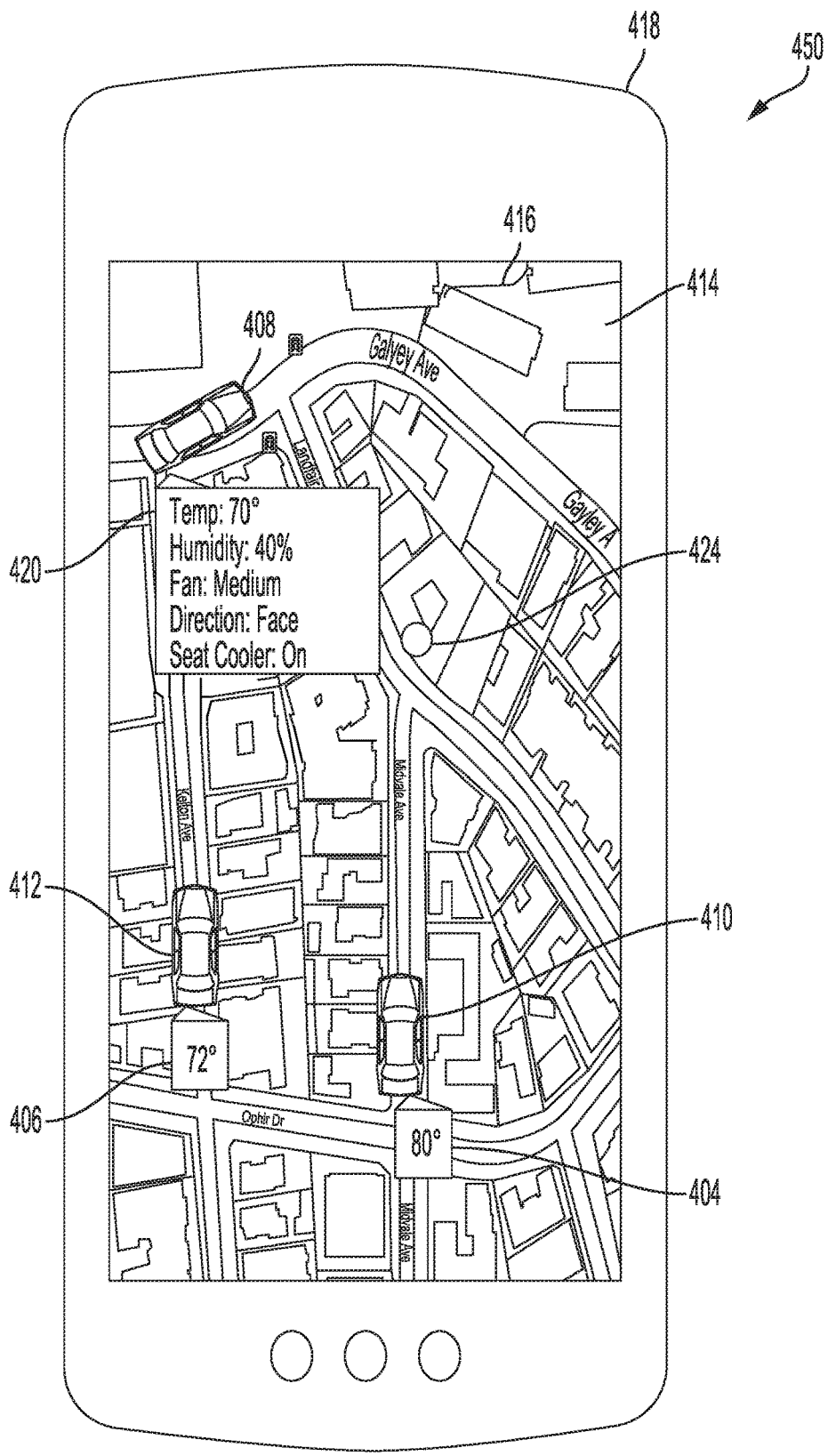

In one configuration, a user selects a vehicle 402, 404, 406 or the displayed comfort component value 408, 410, 412 via a user input. The user input may cause the application to provide additional compartment data. FIG. 4B illustrates an example 450 of providing additional compartment data for a first vehicle 402 according to aspects of the present disclosure. In the example of FIG. 4B, a user has selected the first vehicle 402 or the comfort component value 408 of the first vehicle 402 via an input, such as a touch input on the display 416. In response to the input, the displayed comfort component value 408 of FIG. 4A is updated to display compartment data 420, such as humidity, fan speed, air direction, and seat cooler status, of the first vehicle 402.

In one configuration, the user requests one of the vehicles 402, 404, 406 based on the displayed comfort component values 408, 410, 412 and/or additional compartment data 420. For example, the user may request the first vehicle 402 and the first vehicle 402 is dispatched to the user's location 424. The request may be provided via a user input. In one configuration, the first vehicle's 402 comfort component values are adjusted to the user's compartment preferences while the first vehicle 402 is in route to the user's location 424. In another configuration, the first vehicle's 402 comfort component values are adjusted to the user's compartment preferences when the user enters the first vehicle 402.

In one configuration, each vehicle is equipped with an interface to activate/de-activate remote comfort component adjustments. For example, the interface may be a button or switch in the vehicle. If the interface is activated, the vehicle's comfort components are remotely adjusted by an operator of an MAAS control center to match the passenger's compartment preferences. The current values of the vehicle's comfort components may be maintained if the interface is not activated.

In one configuration, the interface for the vehicle's comfort components is provided via one or more touch panels. The touch panels may be distributed throughout the vehicle, such that a touch panel is accessible regardless of whether the passenger is in the front or rear seats. In another configuration, upon entering the vehicle, the passenger may control the vehicle's comfort components via their mobile device. In this configuration, the user's mobile device adjusts one or more comfort components based on a direct link to the vehicle or via uplink transmissions to the MAAS control center.

Figure 5:
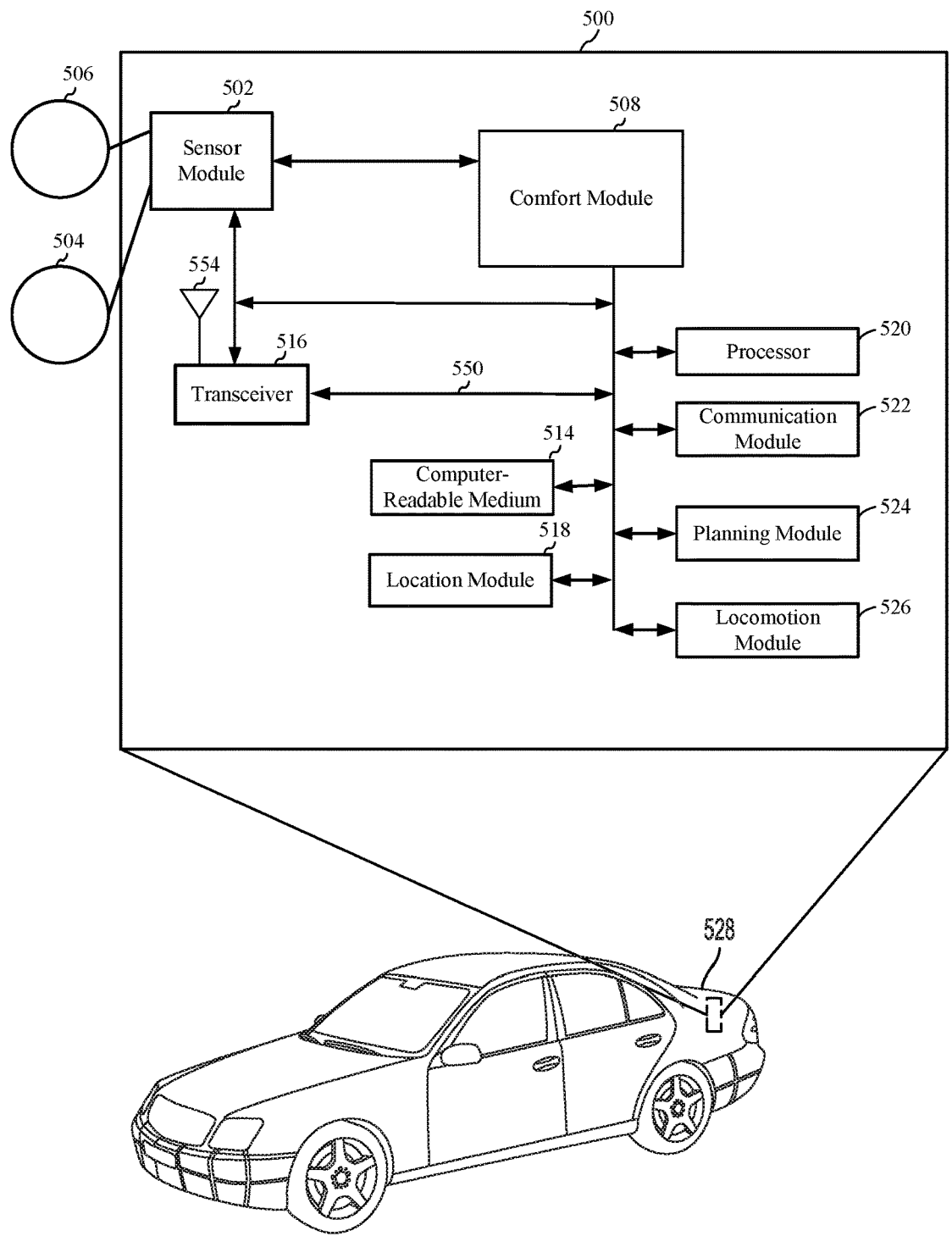
FIG. 5 is a diagram illustrating an example of a hardware implementation for a remote comfort component adjustment system according to aspects of the present disclosure.

FIG. 5 is a diagram illustrating an example of a hardware implementation for a remote comfort adjustment system 500, according to aspects of the present disclosure. The remote comfort adjustment system 500 may be a component of a vehicle, a robotic device, or other device. For example, as shown in FIG. 5, the remote comfort adjustment system 500 is a component of an MAAS vehicle 528. Aspects of the present disclosure are not limited to the remote comfort adjustment system 500 being a component of the vehicle 528, as other devices, such as a bus, boat, drone, or robot, are also contemplated for using the remote comfort adjustment system 500. The vehicle 528 may be autonomous or semi-autonomous.

The remote comfort adjustment system 500 may be implemented with a bus architecture, represented generally by a bus 550. The bus 550 may include any number of interconnecting buses and bridges depending on the specific application of the remote comfort adjustment system 500 and the overall design constraints. The bus 550 links together various circuits including one or more processors and/or hardware modules, represented by a processor 520, a communication module 522, a location module 518, a sensor module 502, a locomotion module 526, a planning module 524, and a computer-readable medium 514. The bus 550 may also link various other circuits such as timing sources, peripherals, voltage regulators, and power management circuits, which are well known in the art, and therefore, will not be described any further.

The remote comfort adjustment system 500 includes a transceiver 516 coupled to the processor 520, the sensor module 502, a comfort module 508, the communication module 522, the location module 518, the locomotion module 526, the planning module 524, and the computer-readable medium 514. The transceiver 516 is coupled to an antenna 554. The transceiver 516 communicates with various other devices over a transmission medium. For example, the transceiver 516 may receive commands via transmissions from a user or a remote device. As another example, the transceiver 516 may transmit driving statistics and information from the comfort module 508 to a server (not shown).

The remote comfort adjustment system 500 includes the processor 520 coupled to the computer-readable medium 514. The processor 520 performs processing, including the execution of software stored on the computer-readable medium 514 providing functionality according to the disclosure. The software, when executed by the processor 520, causes the remote comfort adjustment system 500 to perform the various functions described for a particular device, such as the vehicle 528, or any of the modules 502, 508, 514, 516, 518, 520, 522, 524, 526. The computer-readable medium 514 may also be used for storing data that is manipulated by the processor 520 when executing the software.

The sensor module 502 may be used to obtain measurements via different sensors, such as a first sensor 506 and a second sensor 504. The first sensor 506 may be a vision sensor, such as a stereoscopic camera or a red-green-blue (RGB) camera, for capturing 2D images. The first sensor 506 may be used to determine a number of passengers in a compartment. The first sensor 506 may also be used to determine weather conditions, such as rain or fog, as well as detecting other conditions, such as a foggy window. The second sensor 504 may be a climate sensor used for determining temperature, humidity, and/or other climate components. Of course, aspects of the present disclosure are not limited to the aforementioned sensors as other types of sensors, such as, for example, light detection and ranging (LIDAR), a radio detection and ranging (RADAR), sonar, and/or lasers are also contemplated for either of the sensors 504, 506. The measurements of the first sensor 506 and the second sensor 504 may be processed by one or more of the processor 520, the sensor module 502, the comfort module 508, the communication module 522, the location module 518, the locomotion module 526, the planning module 524, in conjunction with the computer-readable medium 514 to implement the functionality described herein. In one configuration, the data captured by the first sensor 506 and the second sensor 504 may be transmitted to an external device via the transceiver 516. The first sensor 506 and the second sensor 504 may be coupled to the vehicle 528 or may be in communication with the vehicle 528.

The location module 518 may be used to determine a location of the vehicle 528. For example, the location module 518 may use a global positioning system (GPS) to determine the location of the vehicle 528. The communication module 522 may be used to facilitate communications via the transceiver 516. For example, the communication module 522 may be configured to provide communication capabilities via different wireless protocols, such as WiFi, long term evolution (LTE), 5G, etc. The communication module 522 may also be used to communicate with other components of the vehicle 528 that are not modules of the remote comfort adjustment system 500.

The locomotion module 526 may be used to facilitate locomotion of the vehicle 528. As an example, the locomotion module 526 may control movement of the wheels. As another example, the locomotion module 526 may be in communication with a power source of the vehicle 528, such as an engine or batteries. Of course, aspects of the present disclosure are not limited to providing locomotion via wheels and are contemplated for other types of components for providing locomotion, such as propellers, treads, fins, and/or jet engines.

The remote comfort adjustment system 500 also includes the planning module 524 for planning a route or controlling the locomotion of the vehicle 528, via the locomotion module 526. A route may be planned to a passenger based on compartment data provided via the comfort module 508. In one configuration, the planning module 524 overrides the user input when the user input is expected (e.g., predicted) to cause a collision. The modules may be software modules running in the processor 520, resident/stored in the computer-readable medium 514, one or more hardware modules coupled to the processor 520, or some combination thereof.

The comfort module 508 may be in communication with the sensor module 502, the transceiver 516, the processor 520, the communication module 522, the location module 518, the locomotion module 526, the planning module 524, and the computer-readable medium 514. In one configuration, the comfort module 508 receives sensor data from the sensor module 502. The sensor module 502 may receive the sensor data from the first sensor 506 and the second sensor 504. According to aspects of the present disclosure, the sensor module 502 may filter the data to remove noise, encode the data, decode the data, merge the data, extract frames, or perform other functions. In an alternate configuration, the comfort module 508 may receive sensor data directly from the first sensor 506 and the second sensor 504.

In one configuration, the comfort module 508 determines the current compartment data based on information from the sensors 504, 506, the processor 520, the location module 518, and/or the computer-readable medium 514. For example, the sensors 504, 506 may provide internal and external temperature and/or humidity. Additionally, the processor 520 and/or the computer-readable medium 514 may provide the status of comfort components, such as fan speed, air direction, seat heater/cooler, as well as other information, such as battery or gas levels. The location module 518 may provide the vehicle's 528 current location to the comfort module 508.

The comfort module 508 transmits the current compartment data to an MAAS control center via the transceiver 516. The current compartment data may be transmitted based on a trigger received via the transceiver 516, a schedule, and/or when one or more comfort component values is out of range. Additionally, the comfort module 508 may receive one or more instructions from the MAAS control center via the transceiver 516. The instructions may adjust one or more comfort components. Additionally, the comfort module 508 may receive one or more instructions from a passenger via the transceiver 516. The passenger's instructions may also adjust one or more comfort components.

Figure 6:
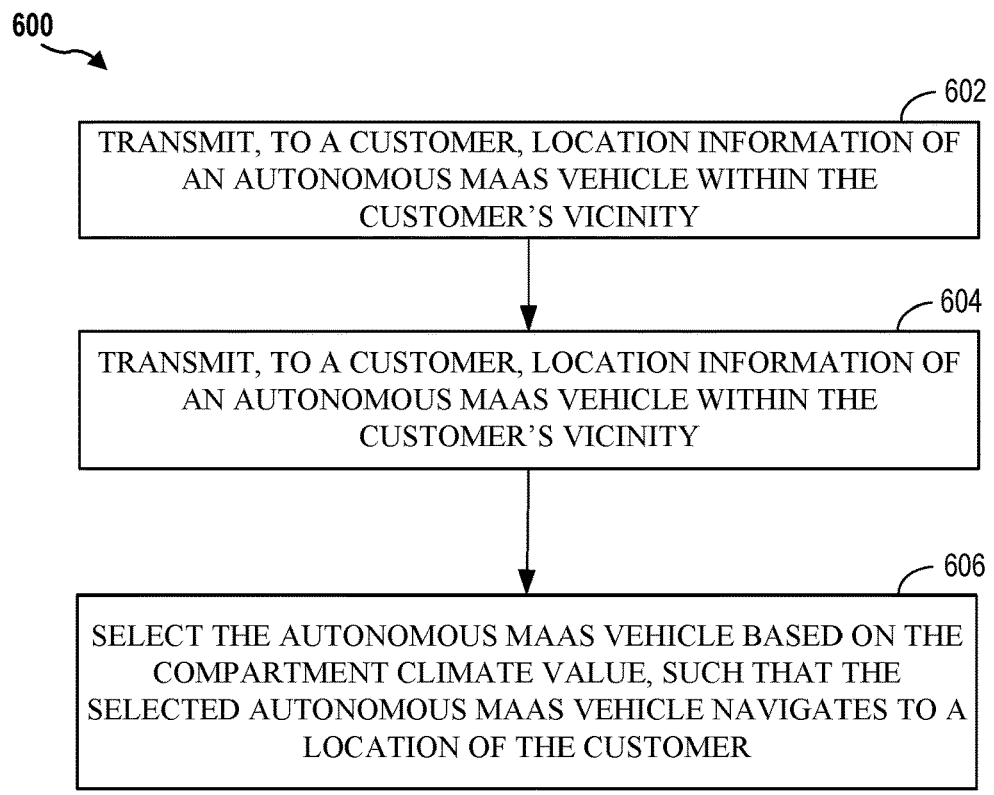
FIG. 6 illustrates a flow diagram for a method for selecting an MAAS vehicle according to aspects of the present disclosure.

FIG. 6 illustrates a method 600 for selecting an MAAS vehicle according to aspects of the present disclosure. As shown in FIG. 6, at block 602 an MAAS control center transmits, to a customer, location information of an autonomous MAAS vehicle within the customer's vicinity. The location information may be transmitted in response to a customer's vehicle reservation request.

At block 604, the MAAS control center transmits, to the customer, a compartment climate value corresponding to the autonomous MAAS vehicle. The location information and the compartment climate value are intended for display on the customer's mobile device (see FIG. 4A). The compartment climate value may be based on compartment data received at the MAAS control center. The compartment data may include compartment temperature, external temperature, compartment humidity, external humidity, a number of passengers in the vehicle, battery level, gas level, fan speed, air direction, and/or seat heating/cooling status.

At block 606, the MAAS control center selects the autonomous MAAS vehicle based on the compartment climate value. The selected autonomous MAAS vehicle navigates to a location of the customer in response to the selection. In one configuration, the customer selects the autonomous MAAS vehicle in response to the compartment climate value. The customer has an option to not select the autonomous MAAS vehicle if the compartment climate value is not desirable.

In another configuration, the MAAS control center selects the MAAS vehicle based on the compartment climate value and the customer's compartment preferences. The customer's compartment preferences may have been previously transmitted from the customer to the MAAS control center. The customer's compartment preferences include preferences for compartment temperature, compartment humidity, a number of passengers in the vehicle, fan speed, air direction, and/or seat heating/cooling status.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for selecting an autonomous mobility-as-a-service (MAAS) vehicle performed by a MAAS vehicle control system, comprising:
   monitoring a location of each autonomous MAAS vehicle of a plurality of autonomous MAAS vehicles based on first location information transmitted from each respective autonomous MAAS vehicle;
   receiving, from a user equipment (UE) of a customer, second location information identifying a location of the customer, the location of the customer being remote from the location of each respective autonomous MAAS vehicle of the plurality of autonomous MAAS vehicles;
   receiving, from each autonomous MAAS vehicle of the plurality of autonomous MAAS vehicles, a current compartment climate value based on a triggering event;
   transmitting, to the UE of the customer based on receiving the second location information, the first location information and the current compartment climate value of each respective autonomous MAAS vehicle of a set of autonomous MAAS vehicles within a range of the location, the set of autonomous MAAS vehicles selected from the plurality of autonomous MAAS vehicles, and the current compartment climate value intended to be displayed at the UE;
   receiving, from the UE of the customer, a message identifying an autonomous MAAS vehicle selected by the customer from the set of autonomous MAAS vehicles based on one or both of the current compartment climate value and the first location information; and transmitting, to the identified autonomous MAAS vehicle, a message dispatching the identified autonomous MAAS vehicle to the location, such that the identified autonomous MAAS vehicle autonomously navigates to the location of the customer.

2. The method of claim 1, in which the customer selects the autonomous MAAS vehicle based on the current compartment climate value.

3. The method of claim 1, further comprising:
receiving, at the MAAS vehicle control center, compartment preferences of the customer; and
identifying, at the MAAS vehicle control center, the autonomous MAAS vehicle based on the compartment climate value and the customer's compartment preferences.

4. The method of claim 3, in which the customer's compartment preferences comprises preferences for at least one of compartment temperature, compartment humidity, a number of passengers, fan speed, air direction, seat heating/cooling status, or a combination thereof.

5. The method of claim 1, further comprising receiving, at the MAAS vehicle control center, compartment data from each autonomous MAAS vehicle of the plurality of autonomous MAAS vehicles vehicle, in which:
the compartment data comprises at least one of compartment temperature, external temperature, compartment humidity, external humidity, a number of passengers, battery level, gas level, fan speed, air direction, seat heating/cooling status; and
the current compartment climate value is based on the compartment data.

6. The method of claim 1, further comprising transmitting, to each autonomous MAAS vehicle of the plurality of autonomous MAAS vehicles, a request for the current compartment climate value based on the received second location information, in which the triggering event comprises the request for the current compartment climate value.

7. An apparatus for selecting an autonomous mobility-as-a-service (MAAS) vehicle at a MAAS vehicle control system, comprising:
a processor;
a memory coupled with the processor; and
instructions stored in the memory and operable, when executed by the processor, to cause the apparatus to:
monitor a location of each autonomous MAAS vehicle of a plurality of autonomous MAAS vehicles based on first location information transmitted from each respective autonomous MAAS vehicle;
receive, from a user equipment (UE) of a customer, second location information identifying a location of the customer, the location of the customer being remote from the location of each respective autonomous MAAS vehicle of the plurality of autonomous MAAS vehicles;
receive, from each autonomous MAAS vehicle of the plurality of autonomous MAAS vehicles, a current compartment climate value based on a triggering event;
transmit, to the UE of the customer based on receiving the second location information, the first location information and the current compartment climate value of each respective autonomous MAAS vehicle of a set of autonomous MAAS vehicles within a range of the location, the set of autonomous MAAS vehicles selected from the plurality of autonomous MAAS vehicles, and the current compartment climate value intended to be displayed at the UE;
receive, from the UE of the customer, a message identifying an autonomous MAAS vehicle selected by the customer from the set of autonomous MAAS vehicles based on one or both of the current compartment climate value and the first location information; and
transmit, to the identified autonomous MAAS vehicle, a message dispatching the identified autonomous MAAS vehicle to the location, such that the identified autonomous MAAS vehicle autonomously navigates to the location of the customer.

8. The apparatus of claim 7, in which the customer selects the autonomous MAAS vehicle based on the current compartment climate value.

9. The apparatus of claim 8, in which execution of the instructions further cause the apparatus to:
receive, at the MAAS vehicle control center, compartment preferences of the customer; and
identify, at the MAAS vehicle control center, the autonomous MAAS vehicle based on the compartment climate value and the customer's compartment preferences.

10. The apparatus of claim 9, in which the customer's compartment preferences comprises preferences for at least one of compartment temperature, compartment humidity, a number of passengers, fan speed, air direction, seat heating/cooling status, or a combination thereof.

11. The apparatus of claim 7, in which execution of the instructions further cause the apparatus to receive, at an MAAS control center, compartment data from each autonomous MAAS vehicle of the plurality of autonomous MAAS vehicles vehicle, in which:
the compartment data comprises at least one of compartment temperature, external temperature, compartment humidity, external humidity, a number of passengers, battery level, gas level, fan speed, air direction, seat heating/cooling status; and
the compartment climate value is based on the compartment data.

12. The apparatus of claim 7, in which execution of the instructions further cause the apparatus to transmit, to each autonomous MAAS vehicle of the plurality of autonomous MAAS vehicles, a request for the current compartment climate value based on the received second location information, in which the triggering event comprises the request for the current compartment climate value.

13. A non-transitory computer-readable medium having program code recorded thereon for selecting an autonomous mobility-as-a-service (MAAS) vehicle at a MAAS vehicle control system, the program code executed by a processor and comprising:
program code to monitor a location of each autonomous MAAS vehicle of a plurality of autonomous MAAS vehicles based on first location information transmitted from each respective autonomous MAAS vehicle;
program code to receive, from a user equipment (UE) of a customer, second location information identifying a location of the customer, the location of the customer being remote from the location of each respective autonomous MAAS vehicle of the plurality of autonomous MAAS vehicles;

program code to receive, from each autonomous MAAS vehicle of the plurality of autonomous MAAS vehicles, a current compartment climate value based on a triggering event;

program code to transmit, to the UE of the customer based on receiving the second location information, the first location information and the current compartment climate value of each respective autonomous MAAS vehicle of a set of autonomous MAAS vehicles within a range of the location, the set of autonomous MAAS vehicles selected from the plurality of autonomous MAAS vehicles, and the current compartment climate value intended to be displayed at the UE;

program code to receive, from the UE of the customer, a message identifying an autonomous MAAS vehicle selected by the customer from the set of autonomous MAAS vehicles based on one or both of the current compartment climate value and the first location information; and program code to transmit, to the identified autonomous MAAS vehicle, a message dispatching the identified autonomous MAAS vehicle to the location, such that the identified autonomous MAAS vehicle autonomously navigates to the location of the customer.

14. The non-transitory computer-readable medium of claim 13, in which the customer selects the autonomous MAAS vehicle based on the current compartment climate value.

15. The non-transitory computer-readable medium of claim 14, in which the program code further comprises:
program code to receive, at the MAAS vehicle control center, compartment preferences of the customer; and
program code to identify, at the MAAS vehicle control center, the autonomous MAAS vehicle based on the compartment climate value and the customer's compartment preferences.

16. The non-transitory computer-readable medium of claim 15, in which the customer's compartment preferences comprises preferences for at least one of compartment temperature, compartment humidity, a number of passengers, fan speed, air direction, seat heating/cooling status, or a combination thereof.

17. The non-transitory computer-readable medium of claim 13, in which the program code further comprises program code to receive, at an MAAS control center, compartment data from each autonomous MAAS vehicle of the plurality of autonomous MAAS vehicles vehicle, in which:
the compartment data comprises at least one of compartment temperature, external temperature, compartment humidity, external humidity, a number of passengers, battery level, gas level, fan speed, air direction, seat heating/cooling status; and
the compartment climate value is based on the compartment data.

18. The non-transitory computer-readable medium of claim 13, in which the program code further comprises program code to transmit, to each autonomous MAAS vehicle of the plurality of autonomous MAAS vehicles, a request for the current compartment climate value based on the received second location information, in which the triggering event comprises the request for the current compartment climate value.

* * * * *